United States Patent [19]

Wada et al.

[11] 4,199,004

[45] Apr. 22, 1980

[54] RELIEF AND MAKE-UP VALVE ASSEMBLY

[75] Inventors: Hideo Wada, Fujisawa; Izuru Morita, Sagamihara, both of Japan

[73] Assignee: Caterpillar Mitsubishi Ltd., Tokyo, Japan

[21] Appl. No.: 914,116

[22] Filed: Jun. 9, 1978

[30] Foreign Application Priority Data

Jun. 15, 1977 [JP] Japan .................................. 52-070029

[51] Int. Cl.² .......................................... F16K 17/196
[52] U.S. Cl. ................................ 137/493; 137/454.5; 137/509
[58] Field of Search ..................... 91/441, 451, 468; 137/493, 509

[56] References Cited

U.S. PATENT DOCUMENTS

| | | | |
|---|---|---|---|
| 1,651,971 | 12/1927 | Shield | 137/509 |
| 3,100,503 | 8/1963 | Tennis | 137/491 |
| 3,112,763 | 12/1963 | Tennis et al. | 137/493.5 |
| 4,072,165 | 2/1978 | Bradley | 137/509 X |
| 4,089,344 | 5/1978 | Flascher et al. | 137/493 X |

FOREIGN PATENT DOCUMENTS 1247895  10/1960  France ...................................... 137/509

*Primary Examiner*—Robert G. Nilson
*Attorney, Agent, or Firm*—Charles E. Lanchantin, Jr.

[57] ABSTRACT

A relief and make-up valve assembly is connected to first and second fluid pressure passages in a fluid pressure device. The valve assembly includes a housing of a hollow cylindrical form which communicates with the passages, a valve axially movable in the housing, a piston partitioning the interior of the housing into a low pressure chamber and a back pressure chamber, and a plunger biased by the piston against the valve to move the valve to an opened position away from a valve seat. The valve assembly controls the level of pressure in the first pressure passage by unseating the valve to relieve a preselected pressure from the first pressure passage or alternately to build up a pressure therein.

2 Claims, 3 Drawing Figures

RELIEF AND MAKE-UP VALVE ASSEMBLY

BACKGROUND OF THE INVENTION

1. Field of the Invention

This invention relates to a relief and make-up valve assembly, and more particularly to a dual function valve assembly provided in a fluid pressure device having first and second passages, such that when a preselected high pressure is reached in the first passage then the first passage is brought into open communication with the second passage so as to allow a fluid to flow from the former to the latter, thereby relieving the pressure therefrom, and when the pressure in the first passage becomes lower than that in the second passage, then the second passage is brought into open communication with the first passage, thereby supplying a fluid from the former to the latter to make up or supplement the pressure level in the first passage.

2. Description of the Prior Art

A valve assembly is known, in which, as disclosed in Japanese Pat. Publication No. Sho 38-13336, issued to F. H. Tennis and published July 26, 1963, a pilot-operated relief valve and a make-up valve are combined with each other. However, valve assemblies of this type suffer several disadvantages. Firstly, they are extremely complex and their manufacturing cost is high. Secondly, there is a problem of a spring causing binding to a sliding member due to the streams of fluid acting thereon and an inner poppet failing to be properly seated upon restoring a pressure in a high pressure fluid passage to a normal level. Thirdly, since the relief valve built therein is of the pilot-operated type, there is a lag in response upon relieving an excessively high pressure therefrom. Fourthly, the spring urging the outer poppet valve body against its valve seat for fluid make-up is commonly used for biasing an inner side poppet valve body against its valve seat, limitations are imposed on the construction parameters of the spring, thus leading to an undesirable response to a lowered pressure during a make-up operation.

Another valve assembly is known, in which, as disclosed in Japanese Pat. Publication No. Sho 39-26248, issued to F. H. Tennis, et al and published Nov. 18, 1964, a direct-acting type relief valve and a make-up valve are combined with each other. However, such valve assembly is also undesirably complex, and the manufacturing cost is high. For example, separate high and low pressure poppets and separate valve seats are required. Moreover, the high pressure poppet often becomes unstable during the period between initially opening and the fully opened position. In addition, a fluid pressure device equipped with such a valve assembly can not effectively be operated in a range down to the relief pressure. Still further, the high pressure relief opening is small in diameter, as compared with the size of the entire valve assembly, so that its pressure-relieving capacity is too small.

SUMMARY OF THE INVENTION

It is an object of the present invention to provide an effective relief and make-up valve assembly which is directed to overcoming one or more of the problems as set forth above, and which is simple in construction and relatively low in cost.

According to the present invention, there is provided a relief and make-up valve assembly connecting first and second passages in a fluid pressure device. The valve assembly includes a valve housing having first and second ends, a bore, a third passage, and a valve seat having an opening therethrough, said first end communicating with said first passage, said bore located at said second end, said valve seat located at said first end, and said third passage communicating said second passage with said opening; a valve movable within said valve housing between a closed position against the valve seat and an opened position away therefrom; first means for resiliently urging the valve toward said closed position blocking communication between said first and second passages; piston means slidable in said bore; second means for resiliently urging said piston means toward said second end; and passage means for communicating a preselected pressure in said first passage to said bore moving said piston means against said valve and said valve to said opened position.

DETAILED DESCRIPTION

Figure 1:
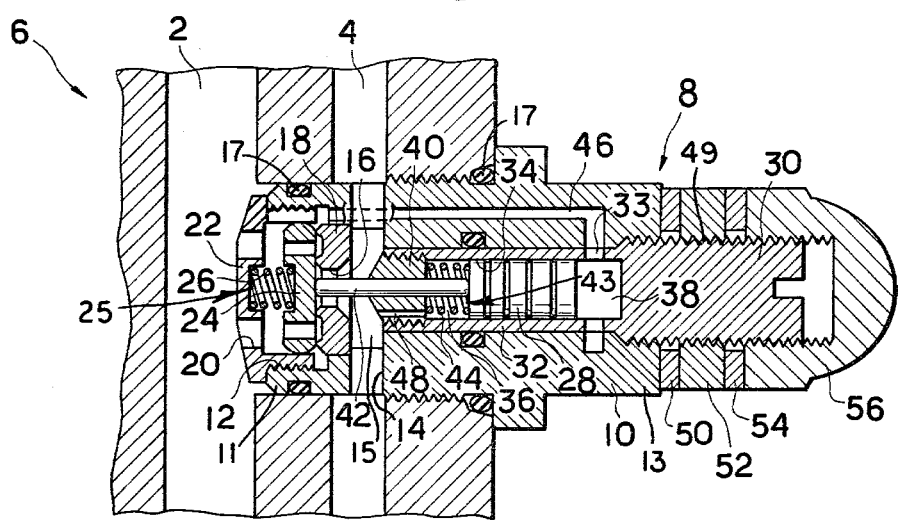
FIG. 1 is a longitudinal cross-sectional view of a first embodiment of the present invention.

As shown in FIG. 1, a first or high pressure passage 2 and a second or low pressure drain passage 4 are defined in a fluid pressure device 6. A relief and make-up valve assembly 8 is operatively associated with these passages and includes a valve housing 10 of generally hollow cylindrical form which is screwthreadably received in the device. Thus, the valve housing has inner and outer ends 11,13, respectively, and an interior portion or stepped internal cavity 15 arranged along a central axis thereof. Conventional annular seal rings 17 are provided to prevent undesirable leakage.

The valve housing 10 has a front threaded opening 12 at the inner end 11 and preferably two or more through passages or side openings 14 disposed at a preselected axial location along the circumference thereof intermediate the inner and outer ends 11,13. Thus, the front opening 12 faces the high pressure passage 2 so as to bring the interior portion of the valve housing into communication therewith, and the side openings 14 face the low pressure drain passage 4 in a manner to bring the interior portion 15 of the valve housing into communication therewith. In addition, the axially outer end or rear end 13 of the valve housing 10 is closed in fluid-tight relation, as will be later described.

A valve seat member 18 having an axially oriented through-hole 16 in its center is fixedly press-fitted in the valve housing 10 between the side openings 14 and the front opening 12. In addition, a valve holder 22 having two or more axially oriented through-holes 20 is screwthreadably received in the opening 12 of the valve housing. Positioned between the valve holder 22 and the valve seat member 18 is a flat-type valve body 24 which is axially slidable within the valve holder. First resilient means 25, such as a relatively weak spring 26, is confined between the valve body 24 and the valve holder 22 so as to continually bias the valve body rearwardly towards the valve seat member 18, or rightwardly when viewing the drawing, and to close the through-hole 16.

A piston 28 is axially slidingly fitted in the valve housing 10 at the rear of the side openings 14. A set-screw member 30 is formed with a hollow, cylindrical extending portion 32 with its front end being open. The set-screw member 30 is threaded at the rear end thereof so that its axial position may be adjusted, with the outer peripheral surface of the set-screw member 30 being fitted in the valve housing 10 along the inner peripheral surface thereof in fluid-tight relation. The piston 28 is axially slidingly received in a bore 34 defined in the extending portion 32 of the set-screw member 30. The outer peripheral surface of the piston 28 engages the bore to partition or divide the bore into a low pressure space or chamber 36 positioned in the front of the piston, and a high pressure space 38 positioned in the rear of the piston. A plug 40 having an axial through-hole 48 is screw-threadably received in the front of the extending portion 32 of the set-screw member 30. Preferably, a separate plunger 42 extends axially and slidingly through the plug, although it is to be appreciated that the plunger could be integrally connected to the piston. Thus, the rear end of the free floating plunger contacts or is positioned in close proximity to the front end of the piston 28, and the front end of the plunger contacts or is positioned in close proximity to the valve body 24. Second resilient means 43, such as a relatively strong second spring 44, is confined between the rear end of the plug 40, which is secured through the medium of the set-screw member 30 to the valve housing 10, and the front end of the piston 28 so as to continually bias the piston rearwardly or to the right when viewing the drawing.

A fluid passage 46 is provided in the peripheral wall of the valve housing 10. The passage 46 is in fluid communication with a hole or port 33 in the rear part of the extending portion 32, and extends axially forwardly to communicate with the front opening 12 and then via the through-holes 20 with the high pressure passage 2. In addition, the through-hole 48 communicates the low pressure space 36 with the side openings 14 and to the low pressure drain passage 4.

A threaded rear end portion 49 of the set-screw member 30 projects axially outwardly from the valve housing 10, and receives in serial relation a seal washer 50, a lock nut 52, a seal washer 54 and a cap nut 56, so that the rear end of the valve housing is closed in fluid-tight relation.

In operation of the above-described relief and make-up valve assembly 8, a force $\Delta P \times B$ depending on $P_1 - P_2 = \Delta P$ and a relatively strong biasing force $F_2$ of the second spring 44 act on the piston 28 having an effective pressure bearing area B which is larger than an effective pressure bearing area A of the valve body 24. Thus, the term $\Delta P$ represents a pressure difference between a low pressure acting on the front end of the piston and a high pressure acting on the rear end thereof; and wherein $P_2$ represents the pressure in the low pressure drain passage 4, and $P_1$ represents the pressure in the high pressure passage 2.

Accordingly, the valve body 24 is urged rearwardly or to the right when viewing the drawing against the valve seat member 18 so as to close the through-hole 16 provided in the valve seat member 18, whenever the force $\Delta P \times A + F_1$ acting thereon is greater than the force $\Delta P \times B - F_2$ urging the piston 28 forwardly or to the left when viewing the drawing ($\Delta P \times A + F_1 > \Delta P \times B - F_2$, i.e., $\Delta P < (F_1 + F_2)/(B - A)$. It being understood that the term $F_1$ represents the relatively weak biasing force of the first spring 26. In other words, in view of the pressure difference $P_1 - P_2 = \Delta P$ between the pressure $P_1$ in the passage 2 and the pressure $P_2$ in the drain passage $P_4$ the following normal relationship exists:

$$\Delta P > (F_1 + F_2)/(B - A)$$

As a result, the high pressure passage 2 is not placed in open communication with the drain passage 4.

When the pressure $P_1$ in the passage 2 increases to a preselected value, and hence a pressure difference exists of $P_1 - P_2 = (F_1 + F_2)/(B - A)$, then the piston 28 and the plunger 42 move forwardly or to the left so that the plunger biases the valve body 24 away from the valve seat member 18, thereby opening the through-hole 16. Under these conditions the passage 2 is brought into open communication with the passage 4, with the result that the excessively high pressure is relieved.

The relief reference pressure, i.e., $(F_1 + F_2)/(B - A)$ may be set to the preselected value by adjusting the axial or lengthwise position of the set-screw member 30 by screw-threadably rotating the member 30 in the valve housing, as well as by adjusting the biasing force $F_2$ of the second spring 44. When the set-screw member is rotated so as to move to the left when viewing the drawing, then the biasing force $F_2$ of the second spring is reduced, so that the relief reference pressure is lowered. Conversely, when the set-screw member retracted or moved to the right, then the biasing force $F_2$ is increased, so that the relief reference pressure is increased.

On the other hand, when the pressure $P_1$ in the passage 2 is lower than the pressure $P_2$ in drain passage 4 (which is normally at about atmospheric pressure) i.e., lowered to a vacuum level, then the pressure difference $P_1 - P_2 = \Delta P$ which acts on the effective pressure bearing area A of the valve body 24 becomes a vacuum or is brought to a negative level. As a result, the force $\Delta P \times A$ acting on the valve body 24 moves it forwardly against the force of the weak first spring 26, so that the valve body is unseated from the valve seat member 18. Accordingly, when the absolute value of a force $\Delta P \times A$ acting on the valve body exceeds the relatively weak biasing force $F_1$ of the first spring 26 ($\Delta P \times A \times F_1$, i.e., $\Delta P > (F_1/A)$, then the valve body is moved axially away from the valve seat member, thereby opening the through-hole 16. Accordingly, the passage 2 is brought into communication with the drain passage 4, so that fluid is supplied from the passage 4 to the passage 2 for fluid make-up purposes. Preferably, the biasing force $F_1$ of the first spring 26 is sufficiently high but as low as possible for seating the valve body 24 on the valve seat member 18 when the pressure $P_1$ reaches the same level as the pressure $P_2$. Also, when the pressure $P_1$ is lowered to a vacuum level, and hence when the pressure difference $P_1 - P_2 = \Delta P$ reaches a negative value, the force $\Delta P \times B$ acts on the piston 28 to move it rearwardly or to the right so that no force acts from the piston and plunger 42 against the valve body.

The second and third embodiments of the relief and make-up valve assemblies of the present invention will now be described with reference to FIGS. 2 and 3. In this regard, the reference numerals shown in FIGS. 2 and 3 correspond to those given in the embodiment of FIG. 1, but differ therefrom by having 100 and 200 added thereto.

Figure 2:
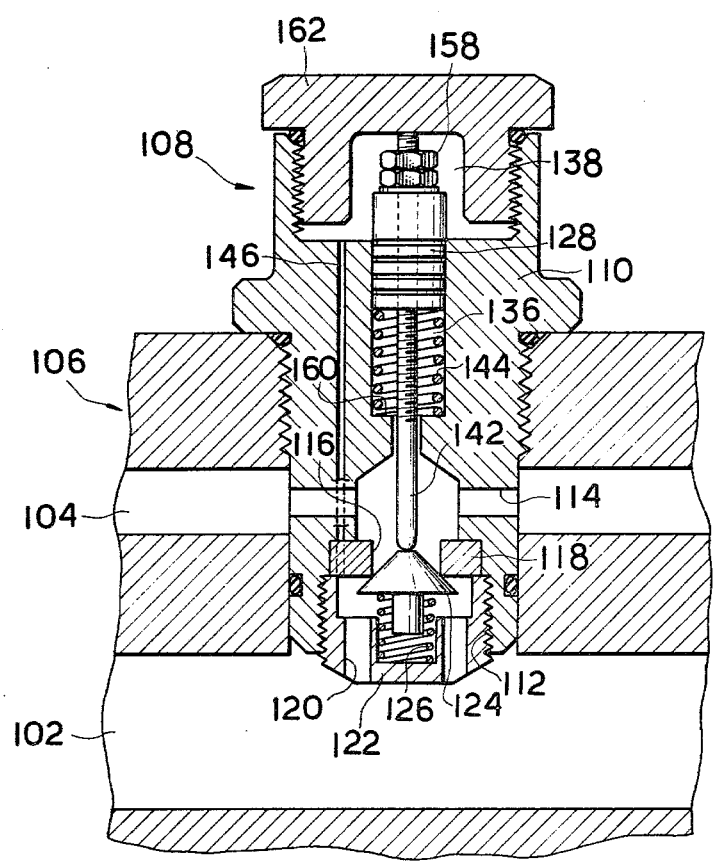
FIG. 2 is a longitudinal cross-sectional view of a second embodiment of the present invention.

As illustrated in FIG. 2, a relief and make-up valve assembly 108 differs from the valve assembly 8 in the following manner. Firstly, in the valve assembly 108 a poppet-type valve body 124 and a valve seat member 118 take over the positions of the flat-type valve body 24 and valve seat member 18. Secondly, the set-screw member 30 is dispensed with, while a piston 128 is directly slidingly provided at the rear of the side openings 114 or at a position above the side openings when viewing FIG. 2. The outer peripheral surface of piston 128 engages the inner peripheral surface of a valve housing 110 in fluid-tight relation in a manner such that the piston partitions the interior of the housing into a low pressure space or chamber 136 located at the front of the piston, and a high pressure space or chamber 138 located at the rear of the piston. Thirdly, a plunger 142 is sealingly threaded into a through-hole defined in the piston and has an extending portion projecting from the rear end of the piston. The plunger is secured to the piston with the aid of lock nuts 158 threaded on the extending portion of the plunger. Fourthly, the use of the plug 40 is avoided, while a relatively strong second spring 144 adapted to bias the piston 128 rearwardly is confined between an annular shoulder portion 160 projecting radially inwardly from the inner peripheral surface of the valve housing 110, and the piston 128, but in a similar location immediately rearwardly of or above the side openings 114. Fifthly, a rear end closing member 162 is threaded in the rear end portion of the valve housing. When the pressure in a high pressure passage 102 is sufficiently low, the rear end of the plunger 142 contacts the inner surface of the closing member 162.

The functions and operations of the valve assembly 108 of FIG. 2 remain substantially the same as those of the valve assembly 8 of FIG. 1. However, in valve assembly 108 the coupling position of the piston 128 and the plunger 142 is adjusted by adjusting the lock nuts 158 so that the biasing force $F_2$ of the second spring 144 acting on the piston may be adjusted, and hence the relief reference pressure, i.e., $(F_1+F_2)/(B-A)$ may be suitably adjusted. When the piston is moved rearwardly or upwardly on the plunger by adjusting the positions of the lock nuts, then the biasing force $F_2$ of the spring 144 is lowered, so that the relief reference pressure is lowered. On the other hand, when the piston is moved forwardly or downwardly on the plunger, then the biasing force $F_2$ is increased and the relief reference pressure is increased.

Figure 3:
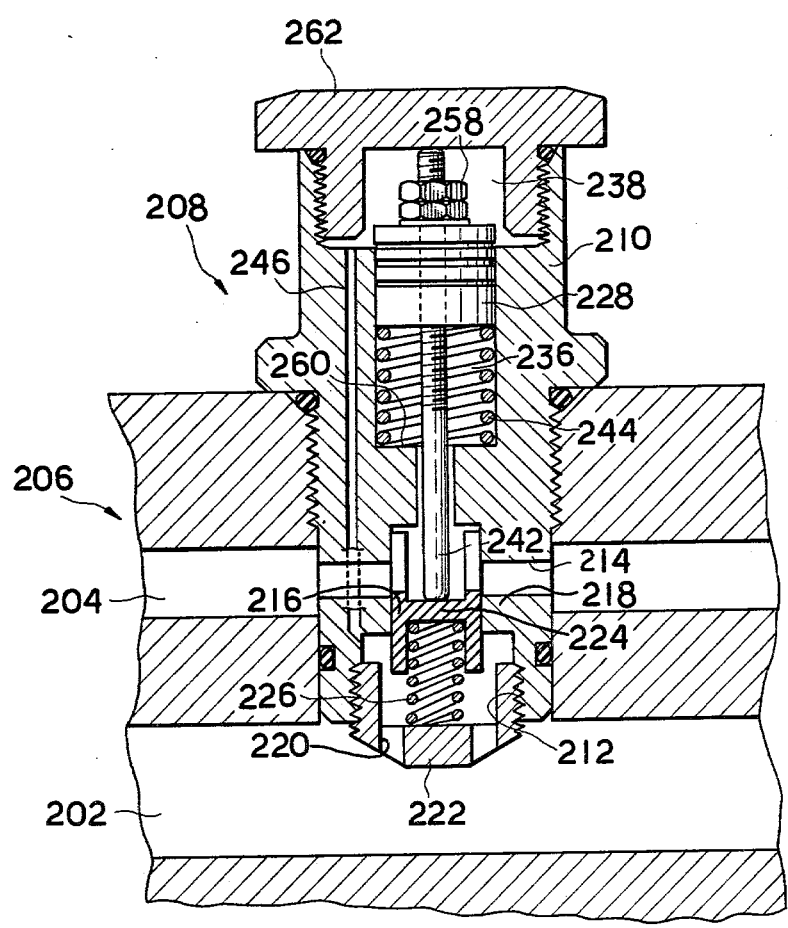
FIG. 3 is a longitudinal cross-sectional view of a third embodiment of the present invention.

Referring now to the relief and make-up valve assembly 208 of FIG. 3, a spool-type valve body 224 takes over the function of the poppet-type valve body 124 in FIG. 2. Also, in contrast to the separate valve seat members 18 and 118 shown in FIGS. 1 and 2, the valve assembly 208 includes a valve seat member 218 integral with a valve housing 210. In other respects the valve assembly 208 functions and operates substantially in the same manner as valve assembly 108 shown in FIG. 2, including the adjustment of the relief reference pressure.

Other aspects, objects and advantages will become apparent from a study of the specification, drawings and appended claims.

What is claimed is:

1. A relief and make-up valve assembly connecting first and second passages in a fluid pressure device, the valve assembly comprising:
    a housing (10) of a hollow cylindrical form having first and second ends (11,13), an opening (12) at said first end (11), and a side opening (14) intermediate said ends (11,13), said housing (10) being closed at said second end (13) and defining a bore (34) at said second end (13), said housing (10) being connected to the fluid pressure device (6) so that said front opening (12) communicates with said first passage (2) and said side opening (14) communicates with said second passage (4);
    a valve seat member (18) having a through-hole (16) and being positioned in said housing (10) between said side opening (14) and said front opening (12);
    a valve holder (22) connected to said first end (11) of said housing (10);
    a valve body (24) movably connected between said valve holder (22) and said valve seat member (18);
    a first spring (26) connected between said valve holder (22) and said valve body (24) and biasing said valve body (24) towards said valve seat member (18) to close said through-hole (16);
    a piston (28) movable in said bore (34) of said housing (10) and partitioning said bore (34) into first and second chambers (36,38);
    a plunger (42) slidingly movable in said housing (10) and extending generally between said piston (28) and said valve body (24);
    a second spring (44) connected between said piston (28) and said housing (10) and biasing said piston (28) away from said valve seat member (18);
    a third passage (46) connecting said first passage (2) with said second chamber (38), said third passage (46) extending through said housing (10), said piston (28) and said plunger (42) moving said valve body (24) away from said valve seat member (18) against the force of said first and second springs (26,44), opening said through-hole (16) in response to a preselected pressure in said first passage (2), said valve body (24) moving away from said valve seat member (18) against the force of said first spring (26) in response to a preselected pressure difference in said first and second passages (2,4) acting across the valve body (24) and when said first passage (2) has a pressure below that of said second passage (4);
    a set-screw member (30) having an extending portion (32), said extending portion (32) defining said bore (34) therein, and said set-screw member (30) being sealingly received within said housing (10) and being adjustable along the length of said housing (10); and
    a plug (40) connected to said extending portion (32), said plunger (42) extending slidingly through said plug (40) between said piston (28) and said valve body (24), said second spring (44) being confined between said plug (40) and said piston (28).

2. A relief and make-up valve assembly (8) connecting first and second passages (2,4) in a fluid pressure device (6), the valve assembly (8) comprising:
    a housing (10) of a hollow cylindrical form having first and second ends (11,13), an opening (12) at said first end (11), and a side opening (14) intermediate said ends (11,13), said housing (10) being closed at said second end (13) and defining a bore (34) at said second end (13), said housing (10) being connected to the fluid pressure device (6) so that said front opening (12) communicates with said first passage (2) and said side opening (14) communicates with said second passage (4);
    a valve seat member (18) having a through-hole (16) and being positioned in said housing (10) between said side opening (14) and said front opening (12);

a valve holder (22) connected to said first end (11) of said housing (10);

a valve body (24) movably connected between said valve holder (22) and said valve seat member (18);

a first spring (26) connected between said valve holder (22) and said valve body (24) and biasing said valve body (24) towards said valve seat member (18) to close said through-hole (16);

a piston (28) movable in said bore (34) of said housing (10) and partitioning said bore (34) into first and second chambers (36,38);

a plunger (42) slidingly movable in said housing (10) and extending generally between said piston (28) and said valve body (24), said plunger (42) extending through said piston (28) and projecting from said piston (28);

means (158) for adjusting the relative position of said plunger (42) in said piston (28);

a second spring (44) connected between said piston (28) and said housing (10) and biasing said piston (28) away from said valve seat member (18); and a third passage (46) connecting said first passage (2) with said second chamber (38), said third passage (46) extending through said housing (10), said piston (28) and said plunger (42) moving said valve body (24) away from said valve seat member (18) against the force of said first and second springs (26,44), opening said through-hole (16) in response to a preselected pressure in said first passage (2), said valve body (24) moving away from said valve seat member (18) against the force of said first spring (26) in response to a preselected pressure difference in said first and second passages (2,4) acting across the valve body (24) and when said first passage (2) has a pressure below that of said second passage (4).

* * * * *